(12) United States Patent
Chanley

(10) Patent No.: US 7,544,298 B1
(45) Date of Patent: Jun. 9, 2009

(54) APPARATUS AND METHOD FOR DISPENSING DECOMPOSING BACTERIA INTO A WASTE STREAM

(76) Inventor: David Chanley, APDO 111, Guanacaste (CR)

( * ) Notice: Subject to any disclaimer, the term of this patent is extended or adjusted under 35 U.S.C. 154(b) by 0 days.

(21) Appl. No.: 12/288,657

(22) Filed: Oct. 22, 2008

(51) Int. Cl.
*C02F 3/00* (2006.01)
(52) U.S. Cl. ............... 210/610; 210/205; 210/242.1; 210/615; 435/262.5
(58) Field of Classification Search ............ 210/610, 210/615–617, 205, 242.1; 435/262.5
See application file for complete search history.

(56) References Cited

U.S. PATENT DOCUMENTS

| | | | | |
|---|---|---|---|---|
| 3,242,055 A | * | 3/1966 | De Lucia | 435/176 |
| 3,578,166 A | * | 5/1971 | Paulus et al. | 210/110 |
| 3,662,918 A | | 5/1972 | Crawford | |
| 3,915,853 A | * | 10/1975 | Luck | 210/606 |
| 4,415,450 A | * | 11/1983 | Wolverton | 210/602 |
| 4,439,317 A | * | 3/1984 | Jarrell | 210/151 |
| 5,362,395 A | * | 11/1994 | Dorau et al. | 210/638 |
| 5,543,309 A | * | 8/1996 | Pischel | 435/177 |
| 5,614,411 A | * | 3/1997 | Gastgaber | 435/286.5 |
| 5,788,836 A | * | 8/1998 | Davis | 210/139 |
| 5,804,432 A | * | 9/1998 | Knapp | 435/243 |
| 5,840,182 A | * | 11/1998 | Lucido et al. | 210/202 |
| 5,905,037 A | * | 5/1999 | Cooney et al. | 435/264 |
| 5,935,843 A | * | 8/1999 | Glendening et al. | 435/262 |
| 6,036,852 A | * | 3/2000 | Carman et al. | 210/151 |
| 6,165,356 A | * | 12/2000 | Carman et al. | 210/150 |
| 6,174,718 B1 | * | 1/2001 | Lawler et al. | 435/252.5 |
| 6,325,934 B1 | * | 12/2001 | Tobey et al. | 210/606 |
| 6,383,379 B1 | * | 5/2002 | Choi et al. | 210/195.3 |
| 6,402,941 B1 | * | 6/2002 | Lucido et al. | 210/94 |
| 6,403,364 B1 | * | 6/2002 | Hince | 435/262.5 |
| 6,579,712 B1 | * | 6/2003 | Rothweiler | 435/262.5 |
| 6,662,918 B2 | * | 12/2003 | Takeuchi et al. | 192/3.29 |
| 6,743,361 B1 | * | 6/2004 | Doege et al. | 210/605 |
| 6,767,464 B2 | * | 7/2004 | Boyd et al. | 210/610 |
| 6,770,198 B2 | * | 8/2004 | Newton et al. | 210/601 |
| 6,773,592 B2 | * | 8/2004 | Bellamy et al. | 210/601 |
| 6,861,249 B1 | * | 3/2005 | Kent | 435/262 |
| 6,908,554 B2 | * | 6/2005 | Jackson | 210/601 |
| 7,175,766 B2 | | 2/2007 | Kim | 210/616 |
| 7,300,583 B1 | * | 11/2007 | Heppenstall et al. | 210/606 |
| 7,374,683 B2 | * | 5/2008 | Buelna et al. | 210/603 |
| 2003/0190742 A1 | * | 10/2003 | Whiteman | 435/262 |
| 2006/0000767 A1 | * | 1/2006 | Trauger et al. | 210/503 |
| 2006/0108282 A1 | * | 5/2006 | Ames et al. | 210/609 |
| 2006/0144800 A1 | * | 7/2006 | Barreras et al. | 210/744 |
| 2008/0093295 A1 | * | 4/2008 | Heppenstall et al. | 210/610 |

* cited by examiner

*Primary Examiner*—Chester T Barry
(74) *Attorney, Agent, or Firm*—Law Offices of J.D. Geraigery, P.C.; Janine D. Geraigery

(57) ABSTRACT

A dispensing apparatus and method for the inoculation of a bioremediation agent into a waste stream, including but not limited to sludge or oil. The apparatus is capable of generating and maintaining a continuous release of decomposing bacteria, and living organisms, into a septic tank of sewage treatment system each time a toilet is flushed, or a boat bilge is pumped. The dispensing apparatus and method also provides a solid or liquid inoculate introduced directly into the apparatus for release into the waste stream slowly and continuously over time.

19 Claims, 4 Drawing Sheets

APPARATUS AND METHOD FOR DISPENSING DECOMPOSING BACTERIA INTO A WASTE STREAM

BACKGROUND OF THE INVENTION

1. Field of the Invention

The present invention relates to a dispensing apparatus and method for the inoculation of a bioremediation agent into a waste stream. More particularly, the invention relates to a dispensing apparatus and method wherein the bioremediation agent is decomposing bacteria which is released into a septic tank of sewage treatment system each time a toilet is flushed. In addition, the apparatus and method may be used for oil decomposition.

In the United States alone there are roughly 90,000,000 households, many having one or more bathrooms. This translates into over 300 million people with toilets and septic systems that require the breakdown and removal of sludge and other waste products. In urban areas, this translates to the need for large sewage treatment centers that require vast amounts of energy to function. If performed inefficiently, this process can be wasteful, costly, and harmful to the environment. Thus, it is no surprise that when sewage treatment plants are over extended and unable to meet their increased demands that sewage overflows to pollute the estuaries and other parts of the environment, like aquifers.

Urban sewage systems are maintained by treating the sewage in order to make it innoculous. Septic tanks are commonly found in low-density population areas and do not connect to urban sewage systems. In order for these isolated septic tanks to function efficiently, they require the frequent removal of sludge and waste products. The sludge is spread on and absorbed by the surrounding land. Both of these systems treat human waste, which is relatively easy to break down, as well as animal and vegetable matter, cleaning products, and paper by-products which are much more difficult to treat. Inevitably these systems will malfunction, usually as a result of blockages and leaks, and repairs can be costly and messy. Furthermore, the present invention is able to treat sludge waste from ships.

The present invention is designed to enhance the function of both septic and sewage systems. In addition, cleaning chemicals often damage the ecology of septic tanks and sewage treatment lines. By introducing beneficial bacteria into the system, the present invention speeds the breakdown of sludge. During the normal functioning of the system, if sludge is broken down more quickly, then manual cleaning can be performed less frequently. This also results in less sludge that must ultimately be removed and spread into the ground or incinerated, a great benefit to the environment.

A septic or sewage system that functions more efficiently inherently experiences fewer blockages and leaks. Therefore, the present invention functions as a preventative measure, by saving homeowners and cities many thousands of dollars in repairs.

Furthermore, the apparatus and method of the present invention is useful for oil decomposition. Boat bilges would also benefit from the present invention. The decomposing agents of the present invention would be automatically introduced in the bilge every time it is pumped out. The waste that is pumped out would be cleaner and decomposing. The present application would be very useful in fishing boats, cruise ships, oil tankers, freighters, military ships, private yachts and ferry boats.

2. Description of the Related Art

U.S. Pat. No. 6,325,934 to Tobey, Jr. et. al. discloses sewage waste digestive bacteria and enzymes incorporated into a slow release material and delivered to the site of the waste to digest the solid waste. The slow release material is made heavy so the enzymes and bacteria will be delivered to the sludge in the bottom of a sewage digester chamber and made fat soluble so that the enzymes and bacteria will be delivered to the grease in the waste system to be digested. This selective delivery system prevents the enzymes and bacteria from being diluted in grey water rendering them less effective and discharged from the sewage system without digesting waste.

U.S. Pat. No. 5,543,309 to Pischel et. al. discloses a carrier prepared containing bacteria and/or enzymes for degrading sewage sludge. The carrier can be in the form of a gel containing coloring matter and optionally a deodorant, or in the form of a core for a roll of toilet tissue or a roll of towels. In a preferred embodiment, the carrier is in the form of a tube that is used as a core for a roll of toilet tissue. The tube is formed from at least two layers made from cellulose bonded together with a water soluble bonding agent. Enzymes and/or bacteria can be in a slurry of cellulose pulp used to make the core, in the bonding agent, or in a coating or strip on an inside and/or outside layer. The tube contains a plurality of sets of circumferential perforations that enable, after removing toilet tissue, readily breaking the tube into a plurality of small pieces that can be flushed down a toilet bowl into a sewage system where the pieces disintegrate and release the enzymes and/or bacteria. The tube may also contain a plurality of holes that allow an aqueous medium to readily seep between the layers to assist in disintegration.

U.S. Pat. No. 7,300,583 to Heppenstall et. al. discloses a dispensing apparatus and method for the delivery of remediation agents into, waste systems wherein the apparatus is capable of generating and maintaining a controlled release of concentrated a remediation composition throughout the delivery cycle. The invention also provides a dispensing apparatus and methods wherein the remediation agent is a remediation agent that includes living organisms. Finally, the invention provides a dispensing apparatus and methods wherein compositions of remediation agents are conveniently formulated for specific applications providing a range of retention, activation and release profiles that optimize the remediation effectiveness.

United States Pat. Application No. 2008/0093295 to Heppenstall discloses a dispensing apparatus and method for the delivery of remediation agents into waste systems wherein the apparatus is capable of generating and maintaining a controlled release of a concentrated remediation composition throughout the delivery cycle. The invention also provides a dispensing apparatus and methods wherein the remediation agent is a remediation agent that includes living organisms. Finally, the invention provides a waste water remediation dispensing apparatus and method useful in preventing dry trap in drain systems containing U-traps.

U.S. Pat. No. 5,935,843 to Glendening discloses A liquid waste degradation apparatus (10) and method using microorganism (15) in solution (13) to degrade waste compositions typically found in restaurant settings, is described. The microorganisms are initially cultivated and concentrated to between about $10^9$ and $10^{12}$ cells per gram, preferably dried and then placed in bags (11) for shipment to end users. To activate the microorganisms, the bags containing the microorganisms are provided in a support container and filled with water. The resulting solution is then periodically dispersed into a waste trap (21) holding the liquid waste composition by means of a peristaltic pump (25) controlled by a timer (27) so that the microorganisms can feed on the waste material to degrade the waste material. A waste degradation system (100) particularly adapted for use in an industrial setting is also described.

U.S. Pat. No. 5,614,411 to Gastgaber et. al. discloses Water borne human wastes contained in a holding tank of a self contained convenience facility are decomposed and thus decontaminated as well as deodorized by aqueous live bacteria delivered in a controlled laminar flow through flexible hose controlled by at least one valve from a reservoir of aqueous live bacteria held in a supply container. A flexible, sealed supply container or an open, rigid container having an air inlet is recommended. In addition, a flow meter having communication with this flow, specifically a drip chamber, also recommended. Two valves, one above the flow meter, the other below, is suggested in use with a drip chamber. A spigot attached to the supply outlet is specifically recommended as an upper valve and a simple constriction device which partially constricts the lumen of a length of the hose below the drip chamber is specifically recommended for the lower valve.

U.S. Pat. No. 6,743,361 to Doege et. al. discloses a method for bacterially treating small-tank toilet systems and an apparatus for using same, and in particular, bacterially treating small-tank portable toilets, such as toilet systems in airplanes, busses, campers, trains, boats, and free-standing portable toilets.

U.S. Pat. No. 5,840,182 to Lucido et. al. discloses An apparatus for containing a microorganism culture in an active exponential growth and delivering a supply of microorganisms to an environment containing wastes for bio-augmenting the biodegradation of the wastes. The apparatus comprises a bioreactor and an operably connected controller. The bioreactor has a bioreactor chamber for containing a supply of microorganisms, a second chamber for containing a supply of water and inorganic nutrients, and a third chamber for containing a supply of organic nutrients. The bioreactor is operably connected to the controller in which a first pump is operably connected in fluid communication between the bioreactor chamber and the second chamber and third chamber, and a second pump is operably connected in fluid communication between the bioreactor chamber and the environment containing wastes to be biodegraded. The controller further includes a timer and regulator operably connected to the first and second pumps to effectively maintain the microorganisms in exponential growth in the bioreactor chamber and to deliver microorganisms to an environment to be treated. Also, disclosed is a method for bio-augmenting the biodegradation of wastes.

U.S. Pat. No. 6,402,941 to Lucido et. al. discloses to an apparatus for delivering activated microorganisms to an environment to be treated. The apparatus has a bioreactor containing microorganisms, a supply of organic and inorganic nutrients and a controller. The controller maintains the conditions of the bioreactor so as to maintain the microorganisms in the exponential phase of growth. The controller also doses a portion of the fluid in the bioreactor to the environment to be treated. The invention also provides a method for the biological treatment of wastes and an organic and inorganic composition used to feed the microorganisms in the bioreactor.

United States Pat. Application No. 2006/0144800 to Barreras et. Al discloses a method for marine sewage treatment that comprises the steps of (a) dispensing with each toilet flush a controlled amount of heterotrophic bacteria culture into the boat's holding tank in order to substantially denitrify the sewage and liquefy the solids, (b) pumping raw sewage from said holding tank to fill a radiation loop, (c) applying microwave energy for a predetermined duration to the raw sewage contained within said radiation loop in order to disinfect said sewage, and (d) passing the disinfected hot sewage through a phosphate filter to substantially reduce the phosphate level. The marine sewage treatment system comprises: a toilet, a connection from a water source to said toilet, a connection from a dispenser of heterotrophic bacteria culture to said toilet, a holding tank for toilet sewage having an inlet coupled to said toilet, a macerator pump having an inlet coupled to the outlet of said holding tank and an outlet coupled to the inlet of a radiation loop, a phosphate filter having an inlet connected to the outlet of said radiation loop, an effluent discharge pump having an inlet coupled to the outlet of the phosphate filter and an outlet coupled to an effluent discharge opening to the sea and structure for applying microwave energy to said radiation look to substantially disinfect and heat the waste water effluent in said radiation loop before filtering out the phosphates and discharging the treated effluent into the sea.

U.S. Pat. No. 6,579,712 to Rothweiler et. al. discloses a system for reproducing and dispensing bio-cultures for bio-augmentation, and method therefor. The system comprises a bacteria solution breeding tank, a bacteria solution dispensing metering pump coupled to the bacteria solution breeding tank, an aeration pump coupled to the bacteria solution breeding tank, and an automatic control system coupled to the bacteria solution metering pump and coupled to the aeration pump. A waste-digesting bacteria additive is placed into the bacteria contact tank and added to the wastes and waste byproducts. The growth of the waste-digesting bacteria is enhanced by the addition of a controlled heating source coupled to the bacteria solution breeding tank and a re-circulation pump coupled to the bacteria solution breeding tank.

U.S. Pat. No. 6,767,464 to Boyd et. al. discloses systems for treating water containing unwanted contaminants. More particularly, the present invention relates to waste water treatment systems including biological media used to aerobically or anaerobically treat solid and liquid waste in water for large and small-scale waste water systems in a way that minimizes the size of the system required to output high-quality, environmentally suitable water that is depleted of ammonia, nitrites, nitrates and other contaminants.

U.S. Pat. No. 6,165,356 to Carman et. al. discloses an improved method for in situ microbial filter bioremediation having increasingly operational longevity of an in situ microbial filter emplaced into an aquifer. A method for generating a microbial filter of sufficient catalytic density and thickness, which has increased replenishment interval, improved bacteria attachment and detachment characteristics and the endogenous stability under in situ conditions. A system for in situ field water remediation.

U.S. Pat. No. 6,036,852 to Carman et. al. discloses an improved method for in situ microbial filter bioremediation having increasingly operational longevity of an in situ microbial filter emplaced into an aquifer. A method for generating a microbial filter of sufficient catalytic density and thickness, which has increased replenishment interval, improved bacteria attachment and detachment characteristics and the endogenous stability under in situ conditions. A system for in situ field water remediation.

United States Pat. Application No. 2003/0190742 to Whiteman et. Al. discloses apparatus, methods, and applications for treating wastewater, and more particularly to biological processes for removing pollutants from wastewater. This invention further relates to apparatus and methods for growing microbes on-site at a wastewater treatment facility, and for economically inoculating sufficient microbes to solve various treatment problems rapidly.

U.S. Pat. No. 6,383,379 to Choi et. al. discloses a method of preparing a microbial culture for wastewater treatment comprising the steps of supplying an aerated material derived from an aeration tank (13) to a bioreactor (17) and cultivating a microorganism existing in the aerated material by adding a culture having a relatively long preservation time and a large number of effective microorganisms.

U.S. Pat. No. 4,415,450 to Wolverton discloses a method for treating wastewater comprising the steps of subjecting the wastewater to an anaerobic settling step for at least 6 hours and passing the liquid effluent from the anaerobic settling step through a filter cell in an upflow manner, wherein the effluent is subjected first to the action of anaerobic and facultative microorganisms and then to the action of aerobic microorganisms and the roots of at least one vascular aquatic plant.

U.S. Pat. No. 6,908,554 to Jackson et. al. discloses a method of recycling animal waste into a useable soil nutrient. The method involves separating the solid and liquid fraction of an animal waste slurry and separately treating both fractions with effective amounts of activated naturally occurring soil bacteria. The method also involves adding an odor eliminating microorganism to the animal waste to reduce or eliminate the foul odor of the waste material.

U.S. Pat. No. 6,770,198 to Newton et. al. discloses that the current invention relates to treatment of waste water and in particular to treatment of sewerage effluent. The current invention broadly resides in a method of treating waste water in a waste water reticulation system including inoculating the waste water with an inoculum of selected microorganisms at a site prior to the treatment plant in the waste water reticulation system or discharge site where there is no treatment plant in the waste water reticulation system; and incubating the waste water inoculated with the selected microorganisms to form a culture that reduces waste in the inoculated waste water.

U.S. Pat. No. 6,773,592 to Bellamy et. al. discloses a method of treating waste water and particularly sewerage is disclosed. The method involves treating the conduit system making up the sewerage network before it reaches a typical sewerage treatment plant. A key feature of the method involves introducing an inoculum of selected micro-organisms into a quiescent zone in the conduit system. The quiescent zone is where the water is significantly slowed in its passage along the conduit system and may even be temporarily stationary eg, a pumping well or low point in two sections of pipe. Applicant has ascertained that undesirable micro-organisms tend to flourish in these quiescent zones. By introducing the inoculum a competitive culture of favourable micro-organisms is incubated which is able to out compete the undesirable micro-organisms and lead to break down and degradation of the sewerage in the conduit system before it gets to the treatment plant. Further by suppressing the undesirable micro-organisms damage to the conduit system and problems with odorous gases are reduced.

U.S. Pat. No. 3,915,853 to Luck et. al. discloses a method of treating liquid sewage includes precipitating heavy metals from the sewage, which may have been previously settled, filtered or otherwise treated so as to remove a large proportion of the solids consistent thereof, raising the pH of the sewage to over 11 and preferably over 12, to destroy pathogenic organisms and to release enzymes from bacteria in the sewage, lowering the pH so that it is in a range in which the enzymes digest components of the sewage, adding microorganisms to the sewage to assist in decomposing organic components thereof, killing the organisms developed and removing them, and neutralizing the sewage solution remaining.

U.S. Pat. No. 5,804,432 to Knapp discloses a method and apparatus for treating contaminated water which includes a bioreactor containing contaminant eating bacteria. The contaminated water is introduced into the lower portion of the bioreactor at a predetermined rate. The upper portion of the bioreactor includes media packing which provides surface area for the bacteria. As the contaminated water travels upwardly in the reactor, the bacteria consume the contaminants. Additional bioreactors may be connected in series to the first bioreactor as necessary.

U.S. Pat. No. 5,905,037 to Cooney et. al. discloses an aqueous septic tank maintenance compositions, process for their production, methods for their use as well as methods for the maintenance of sewage systems, particularly septic tanks and cesspools are provided. The aqueous septic tank maintenance compositions feature a high proportion of biologically active agents per unit volume or unit weight of the compositions, and reduced numbers of stabilizing compositions generally required to ensure storage and shelf stability of the biologically active agents contained therein. Processes for the production of these aqueous septic tank maintenance compositions, and methods for their use are also disclosed.

U.S. Pat. No. 7,374,683 to Buelna et. al. discloses a biofilter used for the purification of a waste liquid using layers of filtering material, wherein the waste liquid moves downwardly by gravity while an O2-containing gas moves upwardly therein. The biofilter comprises a gas collector to capture at least a portion of the gas moving upwardly therein to mitigate the problem of biofilter clogging due to a microbial seal at the surface of the uppermost filtering layer.

U.S. Pat. No. 6,174,718 to Lawler et. al. discloses a newly discovered, novel strain of Bacillus bacteria that produces lipase enzymes for the degradation of oleaginous materials such as fats, greases and cooking oils, and protease enzymes to degrade proteins. This novel strain and the enzymes produced thereby have a number of applications, including wastewater treatments, agricultural uses, laundry and dish detergents, drain cleaners and spot removers, among others.

U.S. Pat. No. 6,383,379 to Choi et. al. discloses a method of preparing a microbial culture for wastewater treatment comprising the steps of supplying an aerated material derived from an aeration tank (13) to a bioreactor (17) and cultivating a microorganism existing in the aerated material by adding a culture having a relatively long preservation time and a large number of effective microorganisms.

U.S. Pat. No. 5,362,395 to Dorau et. al. discloses biologically purifying sewage which is organically loaded with substances that are difficult to decompose biologically or are not decomposable biologically has the substances that are difficult to decompose biologically or are not decomposable biologically separated and concentrated to concentrate, the concentrate preferably is treated physically and/or chemically and the treated or untreated concentrate is subjected to a biological transformation or, alternatively, the concentrate is separated from the sewage to be purified. The apparatus has a filtration collecting-basin serving for concentrating the substances that are difficult to decompose biologically or not decomposable biologically, and a membrane-filtering or nanofiltering device connected thereto, in which the substances that are difficult to decompose biologically or not decomposable biologically are retained and to which the sewage with the concentrated substances that are difficult to decompose biologically or not decomposable biologically is supplied on the inlet side, and from which the purified sewage is drawn off on the outlet side.

U.S. Pat. No. 5,788,836 to Davis discloses an invention directed to a sewage treatment system and method for treating sewage by microbes. The system includes and the method uses a settling tank with residual activated sludge and mixed liquor and an activated biofilm filter. Incoming sewage into the settling tank forms a settling tank liquor mixed liquor. Increments of the settling tank liquor mixed liquor are treated in the activated biofilm filter and returned to the settling tank where the treated mixed liquor improves the quality of the settling tank liquor mixed liquor in the settling tank. The process of treating and returning incremental quantities of the settling tank liquor mixed liquor continues over a Predetermined period of time after which the sewage is fully treated.

U.S. Pat. No. 7,175,766 to Kim et. al. discloses an apparatus and method for performing tertiary treatment of sewage based on porous filtering media. The apparatus for performing tertiary treatment of sewage based on porous filtering media includes a reaction tank for receiving effluent wastewater from a primary settling tank; and porous filtering media, which is located in the reaction tank and has a predetermined size of surface area and opening, for settling suspension in the effluent wastewater and removing organic matter and nutritive salts included in the suspension.

United States Pat. Application No. 2006/0108282 to Ames et. al. discloses a waste treatment system suitable for domestic use and capable of producing water suitable for recycling within the household. The system includes a bioreactor (30) and a decomposition chamber (16). The bioreactor (30) is adapted to digest liquid-base waste material using bacteria and is operable under anaerobic, anoxic and/or aerobic conditions. The decomposition chamber (16) decomposes substantially solid waste generated in the bioreactor. The bioreactor and decomposition chamber are in fluid communication such that substantially solid waste material generated in the bioreactor can be transferred to the decomposition chamber for further treatment. Resulting solids may optionally be forwarded to a vegetation cell (24) and the liquid (34) leaving the bioreactor may be optionally passed to a membrane treatment unit (40) and a disinfection unit (50).

United States Pat. Application No. 2006/0000767 to Trauger et. Al. discloses Bioremediation geocomposite articles, and their method of manufacture, for treating (digesting) contaminants in soil or water. The bioremediating geocomposite mat includes a woven or non-woven geotextile, having a thickness of about 6 mm to about 200 mm. In the preferred embodiment, outer layers of the geocomposite article have a porosity sufficient to receive a powdered or granular contaminant-reactive material, contaminant-sorptive material, or a contaminant-neutralizing material in at least outer portions of the thickness across its entire major surface(s) for better contact of the bacteria with contaminants held by the powdered or granular material. In the most preferred embodiment, liquid-permeable cover sheets are adhered to the upper and lower major surfaces of the bacterial-containing geotextile article to prevent a powdered or granular material from escaping from the geotextile during transportation and installation.

U.S. Pat. No. 4,439,317 to Jarrell et. al. discloses an on-location sewage treatment apparatus comprises a tank and a cylindrical wall therein arranged to form therewith a plurality of series-connected pre-treatment compartments. A grinder receives and grinds sewage-containing liquid and introduces same in the form of a colloidal mixture into a first of the pre-treatment compartments. The colloidal mixture gravitates between the pre-treatment compartments, the waste matter being aerobically consumed by bacteria therein. A second cylindrical wall spaced inwardly of the first endless wall forms therewith an intensive treatment compartment which receives pre-treated liquid. An upright porous sheet in the intensive treatment compartment is arranged in a circular accordian-pleated configuration. The sheet supports a bacteria culture thereon which consumes waste matter in the mixture passing through the sheet. Pure oxygen gas is introduced into each of the compartments and includes a sound wave generator for dispersing the oxygen gas. A third cylindrical porous wall disposed within the second wall defines a disinfecting compartment. Ozone gas is introduced into the disinfecting compartment to disinfect the liquid. Pure oxygen formed as a reaction product in the disinfecting compartment is collected and conducted back to the previous compartments.

U.S. Pat. No. 3,578,166 to Paulus et. al. discloses an improved septic tank having a pair of waste receiving chambers with one chamber being connected to the other by a drain pipe whereby liquid wastes from one chamber may drain over to the other after the bacterial treatment has been completed.

U.S. Pat. No. 6,861,249 to Kent et. al. discloses an appliance for accelerating the degradation of feces and other organic wastes is disclosed. The appliance comprises a container containing an accelerator to accelerate the breakdown of fecal wastes, and a transport mechanism for ejecting the accelerator from the container. The accelerator comprises a mixture of microorganism and free enzymes which are environmentally friendly and non-toxic.

U.S. Pat. No. 3,662,918 to Crawford et. al. discloses a septic tank, which may be converted into a grease trap. The tank is preferably made of plastic reinforced with fiber glass and it is further reinforced due to the construction. The tank is light weight, therefore easy to install, is durable and resistant to corrosion due to ground moisture, and will not deteriorate because of exposure to acids and alkalies. The cover of the present tank interfits with the tank in fluid tight relation. It is readily converted into a grease trap by the addition of an exention onto the outlet pipe which extends downward into the tank.

U.S. Pat. No. 6,403,364 to Hince, et. al. discloses the formulation and use of advanced solid-media chemical compositions in the preferred forms of pellets, tablets, capsules, or other similar forms which are designed and intended to enhance the removal of a broad range of recalcitrant organic and inorganic contaminants from a variety of difficult-to-treat environments, in particular, sediments beneath water bodies, by providing an improved means of promoting the anaerobic, biologically mediated degradation, transformation, and/or detoxification of the contaminants. Specific properties of the pellet, tablets, capsules, or other similar forms of the compositions are disclosed which enable the variation in the settling velocity of the compositions and hence the depth to which the compositions will penetrate the underlying contaminated sediments. The compositions comprise carbonaceous co-substrates, inorganic and organic anaerobic electron acceptors, organic and inorganic nutrients to promote the growth of contaminant-degrading microorganisms, and inoculum of naturally occurring microorganisms which act to promote the biodegradation of contaminants.

JP2006/088028, JP2005/058990, WO2006/090184, WO2005/042724, US2003/0234217, EP0974556 were also considered.

While these units may be suitable for the particular purpose employed, or for general use, they would not be as suitable for the purposes of the present invention as disclosed hereafter.

SUMMARY OF THE INVENTION

It is an object of the invention to produce a means for maintaining healthy septic systems, including both private septic tanks and public sewage treatment systems, thereby minimizing and eliminating potential problems.

It is an object of the invention to provide the apparatus and method for use with waste streams including, but not limited to, septic systems and sewage systems and sludge waste from boats.

It is yet another object of the invention to provide an apparatus and method useful for oil decomposition.

It is a further object of the invention to include the apparatus and method of the present invention in boat bilges, such that the bilge water does not negatively affect the environment when it is pumped out.

It is another object of the invention for the apparatus and method to be used in fishing boats, cruise ships, oil tankers, freighters, military ships, private yachts and ferry boats.

It is another object of the invention to provide a means for saving water and ultimately money by displacing water within the apparatus in the toilet tank with every flush.

It is another object of the invention to maintain the health and functionality of the septic ecosystem, as opposed to other products which are designed to aid once there is already an existing problem, such as sewage spillage clean up, the transport of bacteria and enzymes, problems with septic tanks resulting from damaged ecosystems.

It is another object of the invention to efficiently and inherently experience fewer blockages and leaks. The apparatus and method of the present invention allow the decomposition process to begin in the toilet and pipes leading to the treatment plant thereby preventing blockages and leaks. This provides cleaner lift stations and puts a far lesser demand on the treatment plant.

It is another object of the invention to prevent cleaning products from harming the ecology of septic tanks and sewage treatment lines. The apparatus and method of the present invention reintroduce bacteria into the system which helps to restore the health from damage caused by these harmful products. It also alleviates some of the load on septic tanks and sewage treatment plants and helps to reduce the buildup of sludge.

It is an object of the invention to provide a supply of decomposing bacteria to begin the clean-up process at the time and point of a leak. The present apparatus contains the inoculate thus beginning the cleanup process at the time of the leak.

It is another object of the invention to provide a different option from that of a biological filter, as the bacteria is passed through the biological filter and the entire system the beneficial bacteria consume the nutrients and actively grows and distributes the beneficial bacteria.

It is another object of the invention to produce a means for beneficial bacteria to be released with every flush for the healthful maintenance of septic systems and sewage treatment systems, among others.

It is yet another object of the invention to include the apparatus and method of the present invention in every huge boat bilge, such that when the bilge is pumped out the decomposing bacteria are released to help clean the bilge before it is pumped out again.

It is an object of the invention to decrease environmental pollution of estuaries and aquifers caused by unhealthy and overexerted waste streams by the use of the present apparatus and method.

It is another object of the invention to maintain a cleaner environment by contributing to the health of all types of septic systems.

It is another object of the invention to grow and distribute beneficial bacteria necessary for decomposing human and other waste, including harmful cleaning products and chemicals.

It is another object of the invention to inoculate septic systems with nutrients and cultured bacteria to maintain a supply of beneficial bacteria within those systems.

It is another object of the invention to provide a convenient means for distributing beneficial decomposing bacteria into the waste stream automatically with each flush.

It is yet another object of the invention to speed up the breakdown of sewage and septic sludge but inoculating the sludge with living microorganisms that advance the breakdown.

It is another object of the invention to eliminate the need for manually cleaning septic tanks every few years by breaking down the sludge more quickly.

It is another object of the invention to ensure that less sludge must ultimately be removed from the system and spread into the ground or incinerated, benefiting the environment.

It is another object of the invention to serve as a preventative measure, and ultimately save homeowners and cities many thousands of dollars in repairs.

It is a further object of the invention to recuperate the health of septic tanks that may have been damage by the introduction of chemical cleaners.

It is yet another object of the invention to provide a means for low levels of maintenance, as the only human involvement beyond the initial placement in the holding tank is to inoculate said apparatus when the inoculate arrives in the mail or is separately purchased.

It is another object of the invention to inoculate the pipes, registers, and lift stations of public sewage treatment systems with beneficial bacteria, by routinely and automatically inoculating any area that can leak or become obstructed with waste.

It is another object of the invention to provide all of the leaks in public sewage treatment systems with the dose of decomposing bacteria that is needed to actuate the clean-up process.

It is yet another object of the invention to reduce the overwhelming burden placed on sewage treatment plants and public facilities.

It is another object of the invention to provide the inoculate in a form that will contain nutrients and seed bacteria to ensure that other less beneficial bacterial will not take over the bacterial population living inside of the present apparatus.

It is a further object of the invention to provide the inoculate in a form that will dissolve completely over time leaving nothing to block the passive water flow throughout the present apparatus.

This invention is a dispensing apparatus and method for the inoculation of a bioremediation agent into a waste stream, including but not limited to sludge or oil. The apparatus is capable of generating and maintaining a continuous release of decomposing bacteria, and living organisms, into a septic tank of sewage treatment system each time a toilet is flushed, or a boat bilge is pumped. The dispensing apparatus and method also provides a solid or liquid inoculate introduced directly into the apparatus for release into the waste stream slowly and continuously over time.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
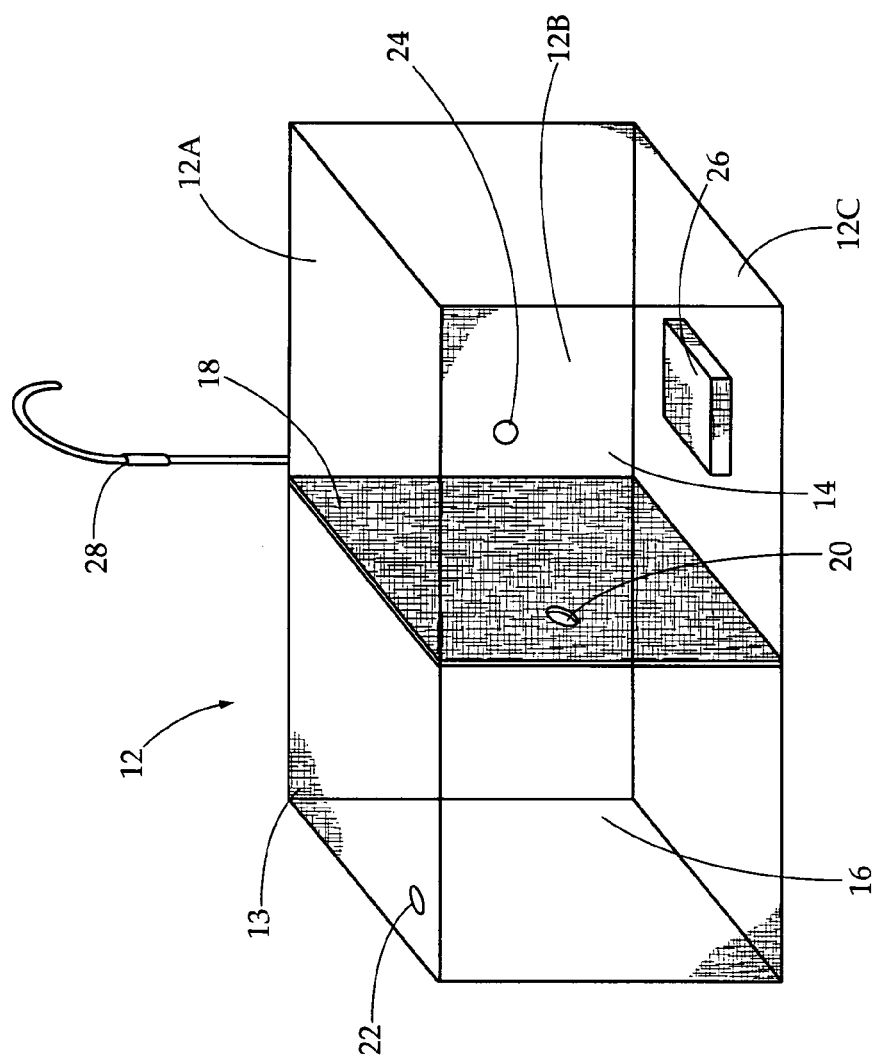
FIG. 1 is a diagrammatic perspective view of a dispensing apparatus and method of the present invention for displacing water and actuating the inoculation of a bioremediation agent into a waste stream, wherein the apparatus consists of a substantially rectangular plastic housed biological filter consisting of a distribution cell and culture cell.

FIG. 1 illustrates a dispensing apparatus and method 10 for displacing water and actuating the inoculation of a bioremediation agent into a waste stream, thereby maintaining healthy sewage systems. The dispensing apparatus and method 10 is primarily used for displacing water in a holding tank 42, preferably a toilet tank, however, it is contemplated for use in other places where housing beneficial decomposing bacteria is useful like boat bilges, and tanks which discard oil. Preferably, the bioremediation agent is decomposing bacteria and micro-organisms released from the toilet tank 42 into a septic tank or sewage treatment system each time the toilet 40 is flushed by one or more openings 47. This facilitates the decomposition process of solid waste or sludge or oil and helps to restore the biological health of septic systems that are injured by chemical cleaning processes. The invention also seeks to help sewage treatment plants, pipes, lift stations and to clean out registers, which all benefit from inoculation of decomposing bacteria.

In generally, the apparatus consists of a substantially rectangular plastic housed biological filter 12 consisting of at least one, but preferably two adjacent cells, a first and second cell 14 and 16, for growing and housing decomposing bacteria. The biological filter 12 is preferably composed of biological filter material, preferably glass fibers 13, which make up both cells 14 and 16 and help to promote beneficial bacteria populations. The surface area within the filter 12 allows for larger beneficial bacteria populations to be housed within the same volume, thus a smaller water exchange provides substantial populations of beneficial bacteria. Specifically, the glass fibers 13 within the filter 12 provide surface area to support higher bacteria densities, while at the same time acting as baffles distributing water flow throughout the filter 12.

The filter 12 may also be composed of plastic sponge like material or other like material. The filter 12 includes a top wall 12A, bottom wall 12B, and front wall 12C. The filter 12 is contemplated in a variety of different shapes and sizes to accommodate different sized toilet tanks 42.

The first cell 14 is a slightly larger distribution cell, while the second cell 16 is a slightly smaller culture cell for growing the beneficial decomposing bacteria. The relative size of the cells can vary depending on specific use and results. The first and second cells 14 and 16 are separated by a wall 18, which has a small hole 20 that connects the distribution cell 14 to the culture cell 16. The hole 20 allows bacteria growing in the culture cell 16 to migrate into the distribution cell 14. The top 12A of the culture cell 16 has a small inoculation hole 22 to the outside. The inoculation hole 22 is for inserting new inoculates 30, while allowing water and air to enter the culture cell 16.

Figure 2:
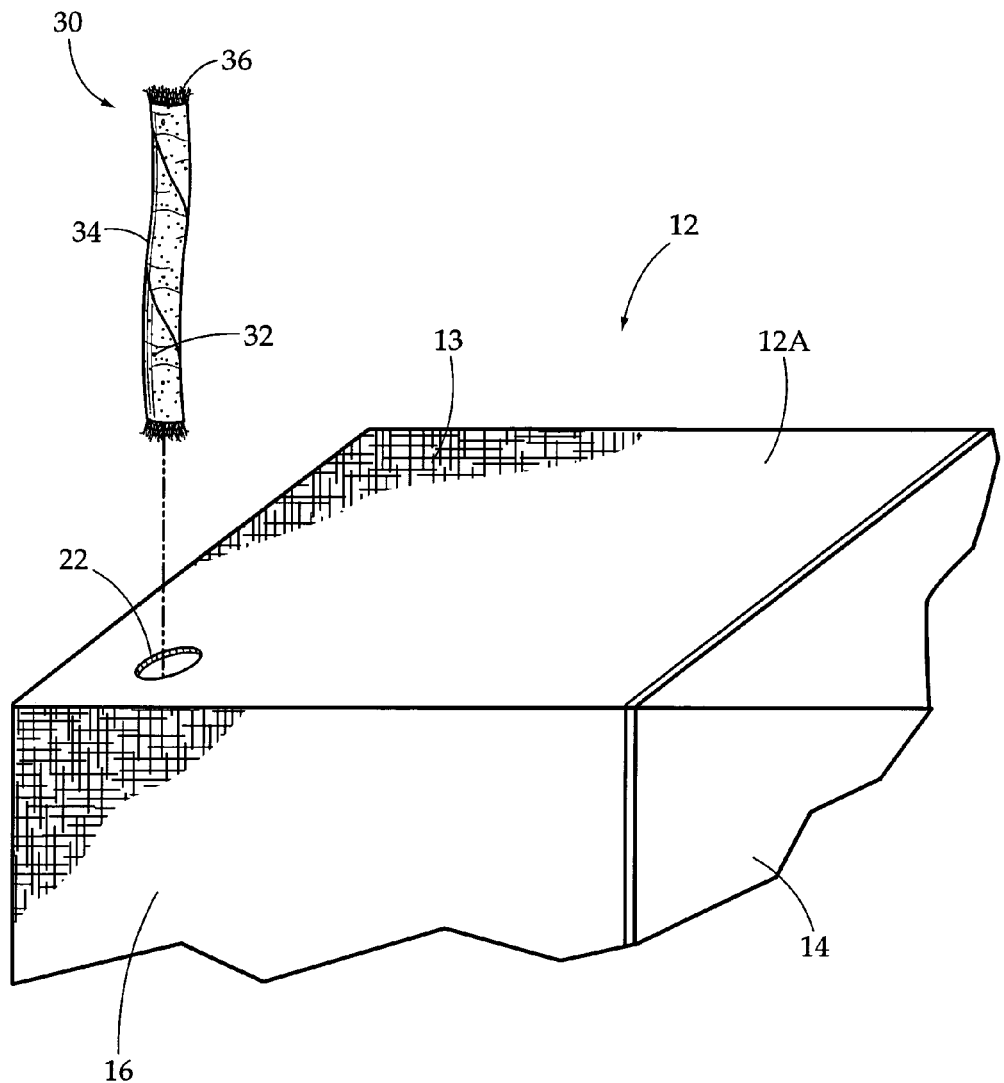
FIG. 2 is a diagrammatic perspective view of a solid inoculate of the present invention, wherein a bacteria culture and media solution is sprayed on a piece of toilet paper.

FIG. 2 illustrates the preferred inoculate. While, the inoculate 30 is contemplated in many different forms, including but not limited to liquid or solid, solid is preferred because it is easiest to handle and transport and is ideal for subscription bulk mailings. The inoculates vary from application to application, region to region and country to country. In the preferred embodiment, the inoculate 30 is a bacteria culture and media solution 32 sprayed on a piece of toilet paper 34. The toilet paper 34 is rolled into a toothpick like cylinder 36, sold in dry stick form. This cylinder 36 is inserted into the inoculation hole 22 at the top 12A of the filter 12. In the culture cell 16 the nutrients and new culture inoculate grows the beneficial decomposing bacteria and holds the bacteria therein for distribution to the distribution cell 14, and eventually the septic system or sewage treatment system. The toilet paper 34 dissolves over time and travels through the culture cell 16 into the distribution cell 14 into the waste stream the same way beneficial decomposing bacteria do. In additional embodiments, the inoculate is liquid and poured directly into the culture cell 16 through the inoculation hole 22. When used for the specific purpose of decomposing oil, different bacteria is contemplated than that required for the breakdown of human waste.

The inoculates are easily transportable and distributable through a variety of different marketing and advertising channels including environmental news, direct mail advertising, and through an online subscription website, along with appropriate instructions for use and awareness information.

Even without the inoculates contemplated, the filter 12 still serves as a money and water saving apparatus, with the ability to filter 12 water through its glass fibers like a regular biological filter. It is still able to house and dispense bacteria even absent the inoculate. However, the bacteria may become displaced by less beneficial bacteria. The inoculate is important for producing the quantities of beneficial bacteria.

The front 12C of the distribution cell 14 has a distribution hole 24 to the outside. The distribution hole 24 is preferably near the top 12A of the distribution cell 14, thereby allowing the filter 12 to retain most of the water housed therein with each flush. The positioning of the distribution hole 24 determines the amount of water released from the filter 12 with each flush, and also the amount of beneficial decomposing bacteria released into the toilet tank with each flush. The allowance of water and air into the culture cell 16 allows the release of water and beneficial decomposing bacteria into the toilet tank.

The bottom 12B of the distribution cell 14 can include a weight 26 for causing the filter 12 to sink and securing its position on the bottom of the toilet tank. In addition, the top 12A of the filter can include an adjustable hook 28 for securing the filter 12 within a toilet tank and providing easy retrieval of the filter 12.

Figure 3A:
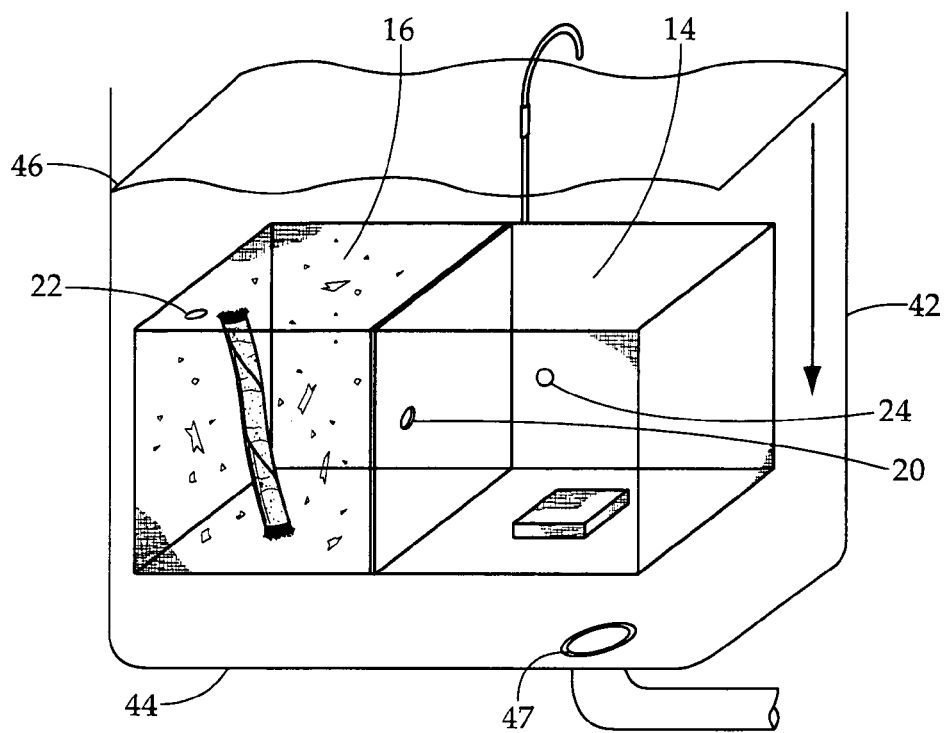
FIGS. 3A-3D is a diagrammatic perspective view of the dispensing apparatus and method of the present invention in use displacing water and actuating the inoculation of a micro-organisms into a toilet tank.
Figure 3B:
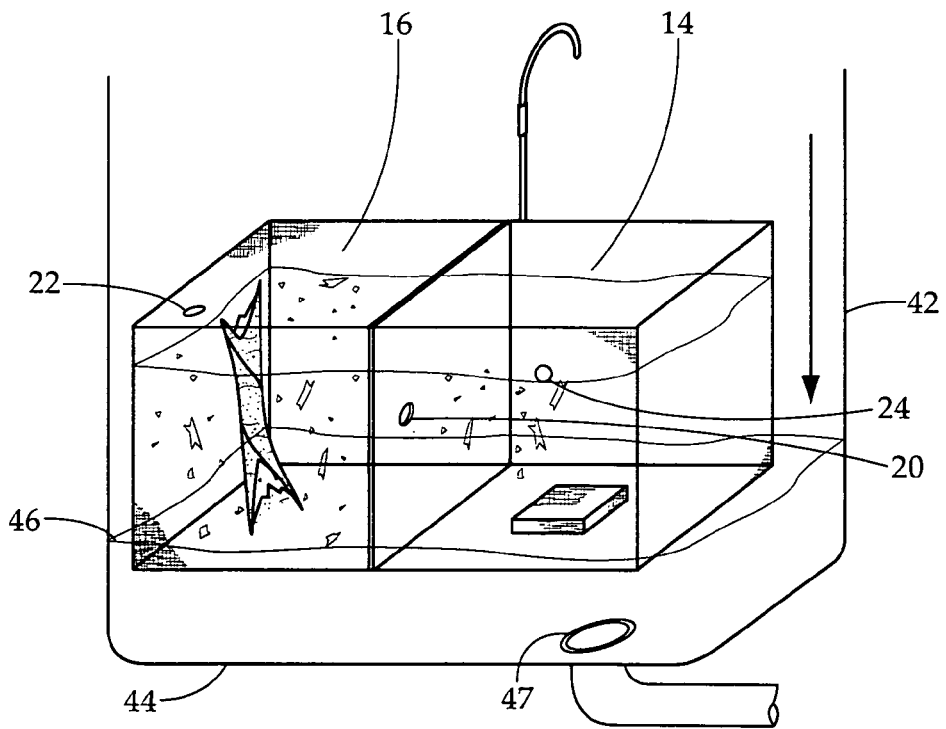
Figure 3C:
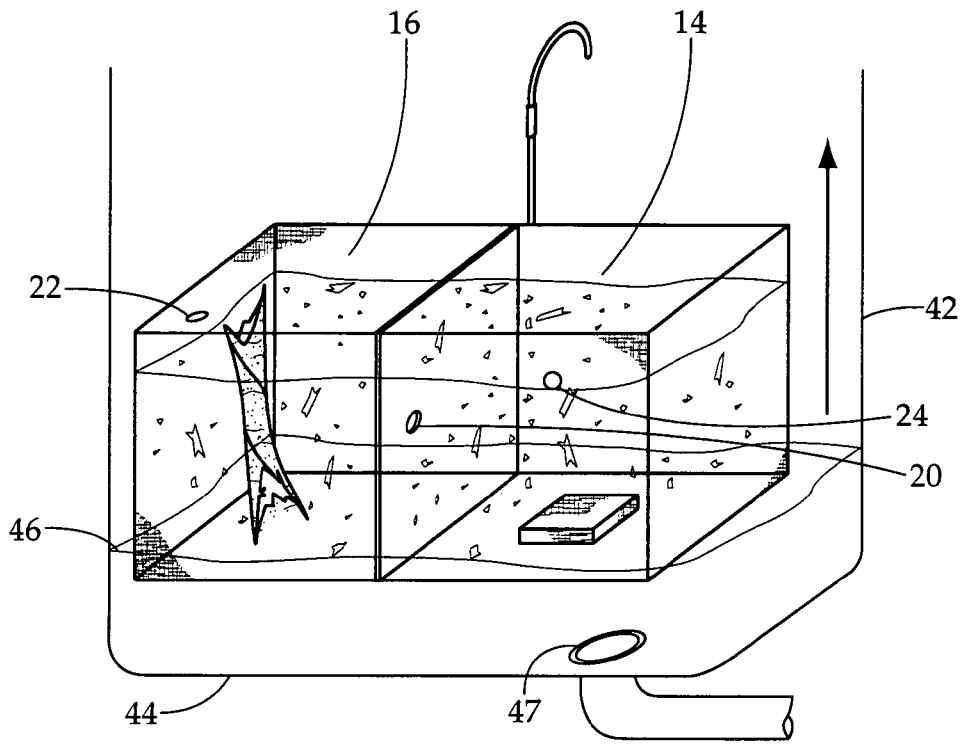

FIGS. 3A-3D illustrate the dispensing apparatus and method for displacing water and actuating the inoculation of a bioremediation agent into a waste stream in use in a toilet 40. Here, the filter 12 sits on the bottom 44 of the toilet tank 42 and is held in position by the weight 26 and adjustable hook 28 as shown in FIG. 3A. The culture cell 16 contains inoculates, which can be poured therein in liquid form or transported in via decomposed toilet paper containing the inoculate, as shown in FIG. 2. The inoculate within the culture cell 16 grows a culture of beneficial decomposing bacteria and stores them therein for automatic distribution with each flush, as shown in FIG. 3A. When a user flushes the toilet 40, water begins to drain from the toilet tank 42, and the water level 46 in the toilet tank 42 begins to lower as shown in FIG. 3B. At this time, water and air are able to enter the filter 12 through the inoculation hole 22 in the top 12A of the culture cell 16. Simultaneously, the water level 46 continues to lower and is drained entirely from the toilet tank 12. Gravity causes a small amount of water within the filter 12 to be drained out through the distribution hole 24. As shown in FIG. 3B, this pressure causes water within the culture cell 16 to travel through the connection hole 20 into the distribution cell as air is naturally pulled into the filter 12 via the inoculation hole 22. The connection hole 20 allows this natural flow to continue every time the toilet 40 is flushed, and thereby allowing the culture cell 16 to inoculate the distribution cell 14 as shown in FIG. 3C.

FIGS. 3A-3C show the dispensing apparatus and method 10 during a first cycle when the inoculate 32 is first added. After which the cycle will continue for each flush as illustrated in FIG. 3D, allowing beneficial bacteria to leave the filter 12 and travel in through the water out of the toilet tank 44 and into the septic system.

Figure 3D:
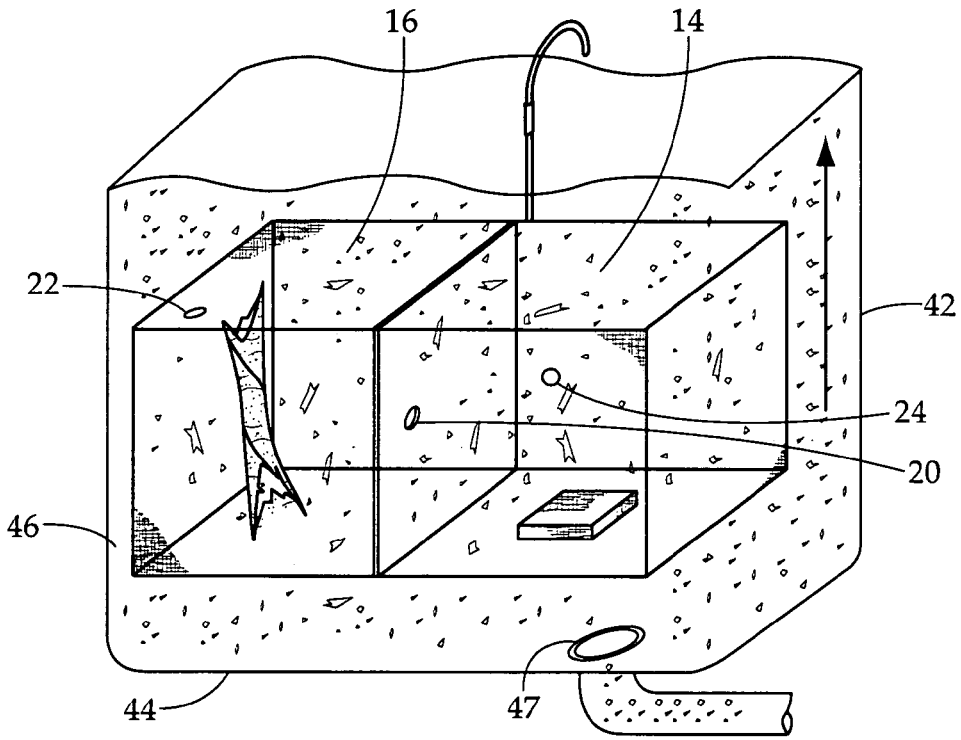

As the water level rises and falls as depicted in FIG. 3D, by a user flushing the toilet 40, the water flow continues through the filter into the toilet tank 42 in a continuous cycle for continuously replenishing the beneficial bacteria. The small amount of water that exits the filter through the distribution hole 24 during each flush contains the inoculate 30. The inoculate 30 then resides within the toilet tank 42 until the next flush when it leaves the tank and travels into the septic tank or sewage system to begin decomposing solid wastes. By retaining most of the water within the filter 12, water is displaced from the toilet tank 42 thereby allowing the toilet tank 42 to use less water for each flush.

While the holding tank contemplated is a toilet tank, other uses are considered relevant and discussed supra. It is another embodiment of the invention to include the apparatus and method in every huge boat bilge, such that when the bilge is pumped out the decomposing bacteria are released to help clean the bilge before it is pumped out again. Specific hold sizes and placements, and the different cell sizes can vary depending on the application.

While the preferred embodiment of the invention focuses on holding tanks that are toilet tanks and septic and sewage treatment plants, the present apparatus and method is also useful for breaking down human waste in boat and oil waste from a bilge. The size of each tank would differ. Therefore, sludge and oil are just two of the waste streams contemplated, and this list is not to be construed as limiting. The present apparatus and method works automatically in any tank that gets partially or completely drained.

In an alternate embodiment, it is contemplated that only one cell is required for use treating waste, preferably from a boat bilge. In this embodiment, the culture cell 16 and the distribution cell 14 would be merged into one cell with a slower dissolving inoculate.

Furthermore, the present apparatus can be introduced with different inoculates and bacteria in order to break down oil waste within a bilge. A boat bilge discards into salt water and considerations like these are contemplated in determining the proper inoculate. The boat bilge apparatus would contain a different germ and media, nutrients, to culture them. In addition, they would dissolve slower.

Moreover, the apparatus and method may also be used in fishing boats, cruise ships, oil tankers, freighters, military ships, private yachts and ferry boats.

Finally, the present apparatus and method is also useful for food production processes for beer or cheese. In this embodiment, the automatic dispensing of bacteria or yeast would be beneficial. Here, the inoculate is different from those contemplated for waste.

In conclusion, herein is presented dispensing apparatus and method for displacing water and actuating the inoculation of a bioremediation agent into a waste stream. The invention is illustrated by example in the drawing figures, and throughout the written description. It should be understood that numerous variations are possible, while adhering to the inventive concept. Such variations are contemplated as being a part of the present invention.

What is claimed is:

1. An apparatus for delivery of a bioremediation composition into a waste stream, comprising:
    a holding tank for a liquid comprising one or more openings;
    an inoculate for dispensing into said waste stream, said inoculate creating a growth of beneficial biological microorganisms;
    a filter for housing decomposing bacteria, said filter comprising a rectangular housing, wherein the housing comprises;
    a top, bottom and front wall;
    a substantially rectangular first cell having a distribution hole on said front wall near the top of said cell for dispensing an inoculate into said holding tank, said first cell having a counter balancing weight adjacent said bottom wall;
    a substantially rectangular second cell adjacent said first cell and slightly smaller than said first cell, wherein said top of said second cell having an inoculation hole for receiving said inoculate and air therethrough;
    a wall separating the first and second cell, said wall having a connection hole connecting the first cell and second cell; and
    an adjustable hook;
    said second cell is positioned such that the inoculate is disposed therein through said inoculation hole and allowed to grow into decomposing micro-organisms and bacteria; and
    wherein said apparatus is orientated such that an inoculate from within said second cell of said filter is dispensed by gravity through said first cell of said filter and into said holding tank and into a waste stream over time.

2. The apparatus of claim 1 wherein the holding tank is a toilet tank which flushes water therethrough, such that water and air enter said filter which allows a pre-determined amount of inoculate to be dispensed through the first cell into the toilet tank.

3. The apparatus of claim 1 wherein the holding tank is a boat bilge which discards bacteria each time bilge is pumped out.

4. The apparatus of claim 1 wherein the first cell is a distribution cell and the second cell is a culture cell for growing the beneficial decomposing bacteria.

5. The apparatus of claim 1 wherein the biological filter is comprised of glass fibers throughout the first and second cells for supporting higher populations of beneficial bacteria.

6. The apparatus of claim 4 wherein the inoculate is liquid and pourable directly into the inoculation hole of the culture cell.

7. The apparatus of claim 4 wherein the inoculate is in dry stick form, including a bacteria culture and media solution sprayed on a piece of toilet paper and rolled into a toothpick like cylinder for insertion within the inoculate hole of the culture cell.

8. The apparatus of claim 1 wherein the waste stream includes sludge, solid waste and oil within the group consisting of septic tanks, sewage treatment systems, pipes, lift stations registers and boat bilges.

9. The apparatus of claim 1 wherein the waste stream is from the group consisting of, sludge, solid waste, human waste, oil, beer or cheese.

10. The apparatus of claim 1 wherein the holding tank is from the group consisting of a boat bilge, toilet tank, or food processing container.

11. The apparatus of claim 1 wherein the first and second cells are merged.

12. The apparatus of claim 1 wherein the adjustable hook extends upwardly from said top wall for securing said filter to said holding tank.

13. An apparatus for displacing water in a toilet tank of a toilet, comprising:
 a filter comprising a rectangular housing, wherein the housing comprises;
  a top, bottom and front wall;
  a substantially rectangular distribution cell having a distribution hole on said front wall near the top of said cell, said first cell having a counter balancing weight adjacent said bottom wall;
  a substantially rectangular culture cell adjacent said distribution cell and slightly smaller than said distribution cell, wherein
  said top of said second cell having an inoculation hole;
  a wall separating the first and second cell, said wall having a connection hole connecting the culture cell and distribution cell; and
  an adjustable hook extending upwardly from said top wall for securing said filter to said holding tank;
 wherein said apparatus is orientated such that water is displaced within said culture and distribution cells of said filter such that when said toilet is flushed less water is disposed through said toilet tank, thereby conserving water over time.

14. A method for remediation of a waste stream comprising the steps of:
 i) providing the apparatus of claim 1;
 ii) introducing an inoculate into said inoculation hole of said culture cell;
 iii) orientating the apparatus within a holding tank such that gravity actuates the decomposing bacteria within said filter to be continuously delivered through said connection hole into said distribution cell and out said distribution hole into the holding tank for dispending said decomposing bacteria to the holding tank; and
 iv) orientating the holding tank for continuously delivering decomposing bacteria into the waste stream.

15. The method of claim 10 wherein the inoculate is liquid and pourable directly into the inoculation hole of the culture cell.

16. The method of claim 10 wherein the inoculate is in dry stick form, including a bacteria culture and media solution sprayed on a piece of toilet paper and rolled into a toothpick like cylinder for insertion within the inoculation hole of the culture cell.

17. The method of claim 10 wherein the waste stream includes sludge, solid waste or oil within the group consisting of septic tanks, sewage treatment systems, pipes, lift stations, registers or bilges.

18. The method of claim 10 wherein the holding tank is a toilet tank which actuates the delivering of the inoculate through the filter and into the toilet tank with each flush of the toilet.

19. The method of claim 14 wherein the holding tank continuously dispenses the inoculate into the waste stream with each flush of the toilet.

* * * * *